(12) United States Patent
Dutta

(10) Patent No.: US 7,072,867 B2
(45) Date of Patent: Jul. 4, 2006

(54) SYSTEM AND METHOD FOR THIRD PARTY LOGGING SERVER

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 09/726,272

(22) Filed: Nov. 30, 2000

(65) Prior Publication Data

US 2002/0065779 A1 May 30, 2002

(51) Int. Cl.
*G06F 17/60* (2006.01)
(52) U.S. Cl. ............................ 705/53; 705/26; 705/40; 705/59
(58) Field of Classification Search ................. 705/1, 705/50–59, 68, 35, 26
See application file for complete search history.

(56) References Cited

U.S. PATENT DOCUMENTS

| | | | | |
|---|---|---|---|---|
| 5,659,742 A | * | 8/1997 | Beattie et al. ............ | 707/104.1 |
| 5,715,314 A | * | 2/1998 | Payne et al. ................. | 705/78 |
| 5,787,413 A | * | 7/1998 | Kauffman et al. ............. | 707/2 |
| 5,864,620 A | * | 1/1999 | Pettitt ......................... | 705/54 |
| 5,892,900 A | * | 4/1999 | Ginter et al. ................. | 726/26 |
| 5,915,022 A | * | 6/1999 | Robinson et al. ............. | 705/75 |
| 5,931,901 A | * | 8/1999 | Wolfe et al. ................. | 709/206 |
| 6,202,056 B1 | * | 3/2001 | Nuttall ........................ | 705/52 |
| 6,282,653 B1 | * | 8/2001 | Berstis et al. ............... | 713/200 |
| 6,330,606 B1 | * | 12/2001 | Logue et al. ................ | 709/226 |
| 6,363,357 B1 | * | 3/2002 | Rosenberg et al. ........... | 705/26 |
| 6,760,711 B1 | * | 7/2004 | Gillett et al. ................. | 705/64 |

FOREIGN PATENT DOCUMENTS

EP 760505 A2 * 3/1997

OTHER PUBLICATIONS

"Three Tier Software Architectures" CMU Software Engineering Institute, http://www.sci.cmu.edu/str/descriptions/threetier_body.html.*
"MP3.com and I-drive.com join forces to store and manage MP3 files", PR Newswire, p. 1236, Oct. 6, 1999.*

* cited by examiner

*Primary Examiner*—Calvin Loyd Hewitt, II
(74) *Attorney, Agent, or Firm*—VanLeeuwen & VanLeeuwen; Jeffrey S. LaBaw

(57) ABSTRACT

A system and method for a third party logging server to keep track of sales by online merchants of copyrighted works. Providers of copyrighted works, such as publishers and authors, register with the third party logging server and acquire an authentication mechanism to use the server, such as a username and password. The providers upload digital works and royalties corresponding to the works to the third party logging proxy server. Online merchants register with the third party logging proxy server and also acquire an authentication mechanism to use the server. The merchant downloads works and royalty rates to the merchant's computer for online sales. The merchant also downloads software that informs the third party logging proxy server whenever the merchant makes a sale. The server keeps track of the sale. The server collects royalty payments from merchants. The server also calculates and sends providers their royalty payments.

33 Claims, 7 Drawing Sheets

SYSTEM AND METHOD FOR THIRD PARTY LOGGING SERVER

BACKGROUND OF THE INVENTION

1. Technical Field

The present invention relates in general to a method and system for providing a third party logging server. More particularly, the present invention relates to a system and method for an independent third party logging distribution of copyrighted works by digital distributors.

2. Description of the Related Art

Distribution of digital copyrighted works, such as digitized music, art works, and software programs, has proliferated with the increased use of the Internet by online distributors and their customers. Distributing copyrighted works over the Internet allows both small and large copyright holders to distribute to a large number of customers. As used herein, a copyright holder is any person or entity with the legal right to distribute a copyrighted work. A copyrighted work is included in the more general term "product" that is distributed by a merchant. A copyright holder can therefore be considered a "provider" of products (e.g. copyrighted works) distributed by merchants. A copyright holder, or provider, therefore, includes publishers that have acquired the right to distribute a copyrighted work, or product, from an author and the authors of such copyrighted works, or products. A copyrighted work, or product, includes such things as software, music, art, designs, photographs, etc.

Some copyright holders have developed their own Internet web sites for distributing their works to customers. However, many copyright holders prefer to create their artistic works rather than spend their time managing an Internet web site. In addition, to attract customers, the author must often spend time, money, and effort advertising their web site. While an independently owned web site might make sense for a large corporation, it is often not profitable for an individual author or small organization.

To avoid the chore of managing an Internet web site, some authors grant distributorship rights to online retail distributors. The author may enter into a written or electronic agreement with online retail distributors granting the distributor the right to distribute the author's works. While this approach alleviates the burden of the author managing and promoting his or her own web site, it increases the author's task in identifying online retail distributors, analyzing the retail distribution agreements, and monitoring the distributors to ensure that the author is receiving proper royalty payments.

On the side of the business relationship, online retail distributors often face legal challenges to their distribution of copyrighted works. Online retail distributors face a challenge in ensuring the legitimacy of alleged authors that send copyrighted works to the distributor for distribution. If the person who sent a digital work to a distributor has no rights to the work, the distributor could be liable for copyright infringement.

While the distributor may keep log of users that upload and download works to and from the distributor's web site, the logs may not prevent the distributor from unknowingly distributing pirated works and, consequently, face copyright liability and damages. In addition, logs maintained by an online retail distributor may not be trusted by copyright holders as legitimate because the logs can be altered by the distributor without any third party oversight.

What is needed, therefore, is a way to provide a third party logging server that keeps track of online retail distributors' sales of copyrighted works. In addition, what is needed is a logging server that allows copyright holders to determine which online distributors are legitimate distributors in order to identify and pursue illegitimate operations that are pirating the copyright holders' works.

SUMMARY

It has been discovered that a third party logging proxy server can aid both copyright holders and online merchants transacting business electronically. The third party logging proxy server establishes relationships with both copyright holders and online merchants.

A copyright holder establishes an agreement with the third party logging proxy server electronically by completing an electronic agreement with the third party logging proxy server or by using a traditional paper-based agreement that is signed and sent to the company hosting the third party logging proxy server. Once an agreement is in place, the copyright holder receives an access mechanism, such as a username and password to access the third party logging proxy server. The copyright holder then downloads works in which the copyright holder has distribution rights. The copyright holder also downloads royalty rates corresponding with the downloaded works. The copyright holder can also use the third party logging proxy server to investigate whether online merchants that are selling the copyright holder's works are legitimate merchants established with the third party logging proxy server.

A merchants also establishes a relationship with the third party logging proxy server in order to have the right to distribute authors' works. As part of the agreement, the merchant agrees to install a piece of software code that tracks the sale of works maintained by the third party logging proxy server and report such sales back to the third party logging proxy server. At the end of a billing cycle, the third party logging proxy server multiplies the number of works sold by a merchant by the respective royalty rates to determine an amount due by the merchant.

The third party logging proxy server earns revenue in several possible ways. First, a third party logging proxy server can charge a flat fee for copyright holders and/or online merchants to use its services. Second, a third party logging proxy server can sell advertising space on its web site that advertises copyright holders' works to perspective online merchants and may also advertise online merchants' to the general public. Third, and perhaps most importantly, the third party logging proxy server can charge a percentage of the fees paid by the online merchants as royalty payments. The third party logging proxy server can either take a portion of the copyright holders' royalties or can add a percentage to the copyright holders' royalties to create a higher royalty amount actually paid by the merchant.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
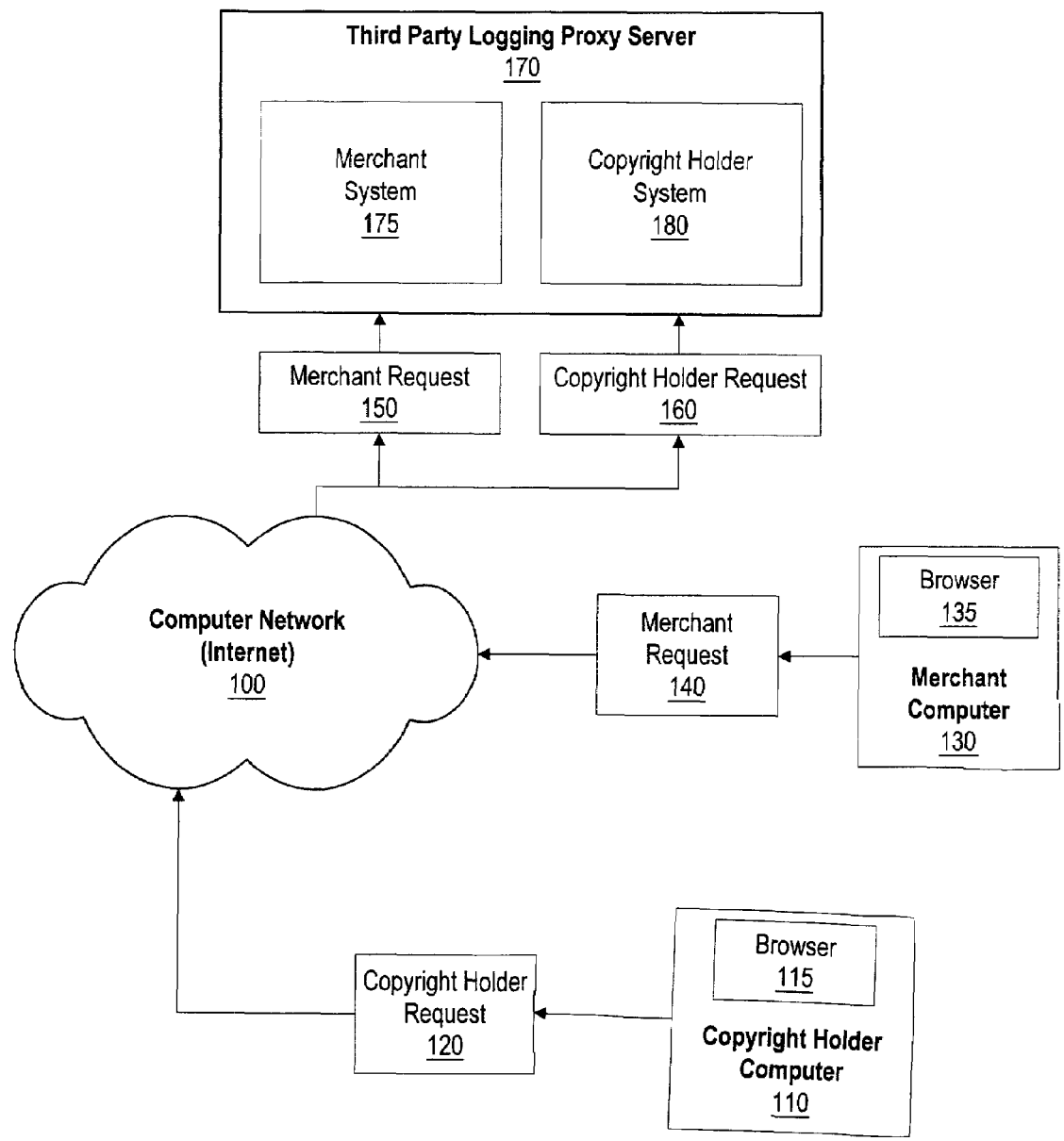
FIG. 1 is a network diagram showing the components used in a third party logging proxy server's interaction with copyright holders and online merchants.

FIG. 1 shows a network diagram of the components used in a third party logging proxy server's interaction with copyright holders and online merchants. Computer network 100, such as the Internet, connects the various components to one another. Copyright holder computer 110 includes a software program 115 used to communicate to other computer connected to computer network 100. Software program 115 may be an Internet browser, such as Netscape Navigator™ or Microsoft Internet Explorer™. A copyright holder sends copyright holder request 120 through computer network 100. Computer network 100, in turn, forwards copyright holder request 160 to third party logging proxy server 170. Third party logging proxy server 170 processes copyright holder request 160 using copyright holder system 180 (see FIGS. 2, and 3 for further copyright holder system details).

Merchant computer 130 includes a software program 135 used to communicate to other computer connected to computer network 100. Software program 135 may be an Internet browser, such as Netscape Navigator™ or Microsoft Internet Explorer™. A merchant sends merchant request 140 through computer network 100. Computer network 100, in turn, forwards merchant request 150 to third party logging proxy server 170. Third party logging proxy server 170 processes merchant request 150 using merchant system 175 (see FIGS. 2, 4 and 5 for further merchant system details).

Figure 2:
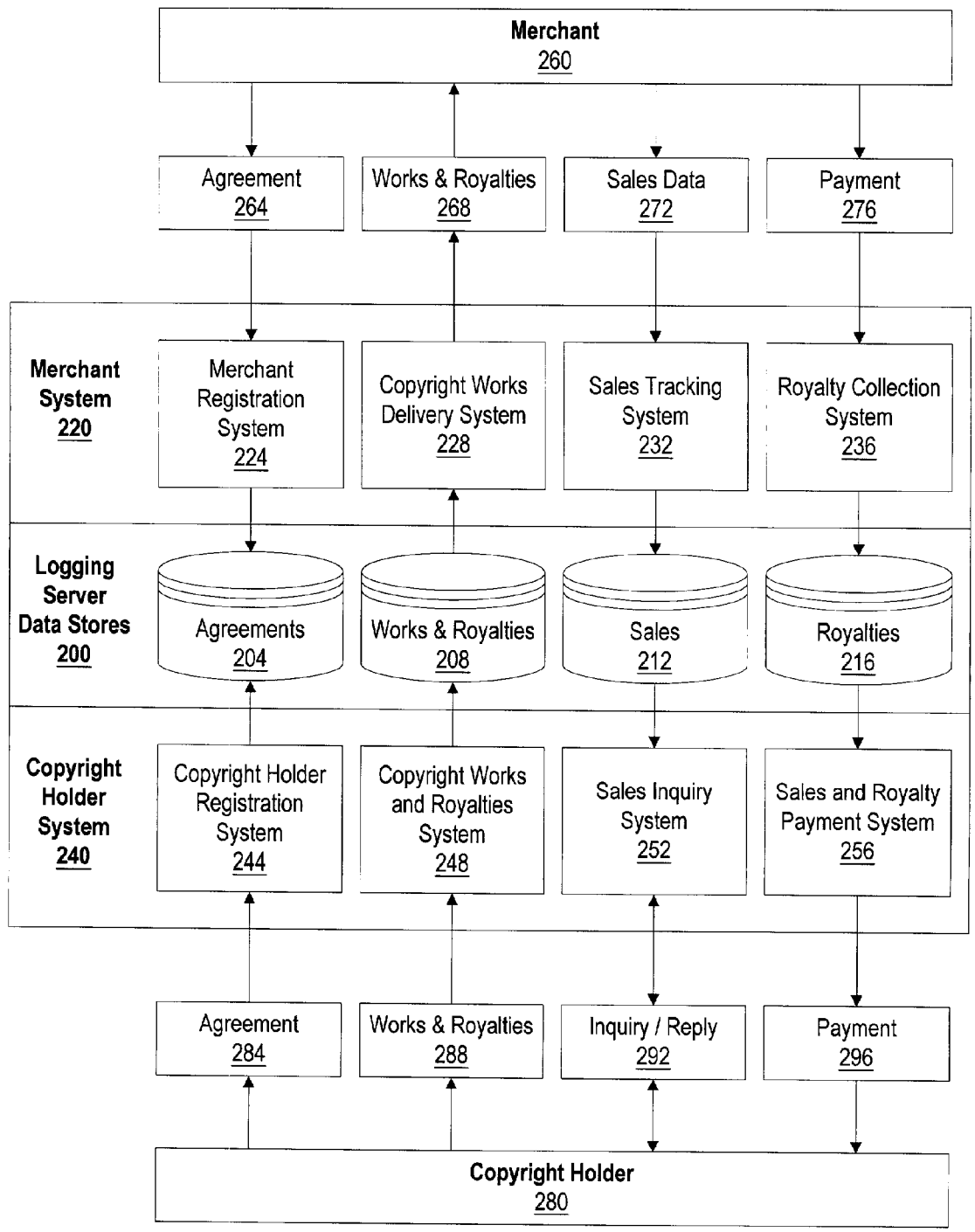
FIG. 2 is a diagram showing the components used in the third party logging proxy server.

FIG. 2 shows a diagram of the components used in the third party logging proxy server. Third party logging proxy server data stores 200 include data maintained by the third party logging proxy server. This data includes online agreements 204 entered by both merchants and copyright holders, copyrighted works and royalty schedules 208 provided by copyright holders, sales information 212 reported by merchants, and royalty data computed by the third party logging proxy server and paid to copyright holders based on the number of sales and the royalty rates (less any third party logging proxy server servicing fees).

Merchant system 220 include software components used to handle online merchants. These software components include merchant registration system 224 used to establish a relationship between a merchant and third party logging proxy server through the use of an online or paper-based agreement. Merchant 260 sends agreement 264 which is processed by the third party logging proxy server's merchant registration system 224. Merchant registration system 224 also provides merchant 260 with an access mechanism, such as a username and password, used by the merchant to gain access to the third party logging proxy server. Copyrighted works delivery system 228 used to deliver copyrightable works and royalty information to merchants that have established a relationship with the third party logging proxy server. Merchant 260 sends a request for copyrightable works, and copyrightable works delivery system 228 responds by providing works and royalties 268 to merchant 260. In some embodiments, new copyrighted works and royalties are automatically forwarded to merchants when received from copyright holders through copyright works and royalties system 248. The copyrightable works are used in the merchant's delivery of items to customers whereas the royalty information can be used to determine a sales price after adding in the merchant's desired profit margin. Sales tracking system 232 used to receive sales data 272, using either a batch or real time delivery mechanism, from merchant 260 and logging the sales data for royalty computations. Royalty collection system 236 used to receive payment 276 from merchant 260 based on the number of sales the merchant has made during the billing cycle and the royalty rate set for the various copyrightable works. Depending on the merchant's credit, the merchant may prepay an amount that is depleted as the merchant sells items (i.e., for a merchant with little credit), or the logging server may simply bill the merchant at the end of a billing cycle (i.e., for a merchant with good or established credit).

Copyright holder system 240 include software components used to handle copyright holders. These software components include copyright holder registration system 244 used to receive agreement 284 from copyright holder 280 and establish a relationship between the third party logging proxy server and copyright holder 280. Copyright holder registration system 244 also provides copyright holder 280 with an access mechanism, such as a username and password, used by the copyright holder to gain access to the third party logging proxy server. Copyright works and royalties system 248 receives copyrighted works and royalties 288 from copyright holder 280. Copyrighted works are preferably in a digital format. The corresponding royalty rates may be specified for individual copyrighted works or may be a general amount (i.e., $5 for any of the copyright holder's works). In addition, the copyright holder may use an adjustable royalty system, such as $10 for the first 10 copies sold by a merchant during a billing cycle, $7 for the next 20 items, and $5 for each sale thereafter. Sales inquiry system 252 allows copyright holder 280 to inquire about an online merchant's sales. If copyright holder 280 is aware of a merchant selling the copyright holder's works, the copyright holder can inquire as to whether the merchant has an established relationship with the third party logging proxy server. If the merchant does not have a relationship (as reported in inquiry/reply 292), then the copyright holder may pursue the merchant to determine whether the merchant is pirating the copyright holder's works. On the other hand, if the merchant is an established merchant with the third party logging proxy server, then inquiry/reply 292 includes information about the merchant's sales of the copyright holder's works. In addition, a general inquiry can be made to receive a list of all established merchants that have sold one or more of the copyright holder's works. Sales and royalty payment system 256 calculates the amount due to the copyright holder during the billing cycle. The third party logging proxy server may pay copyright holder's based on the amount of payments actually received from merchants during the billing cycle or based on the amount of royalties due notwithstanding any payments made by the merchants. If royalty payments are based on the amount collected from merchants, then the copyright holder's bear the risk of a merchant defaulting or failing to pay. On the other hand, if the royalty payments are based on the amount of royalties due notwithstanding any payments made by the merchants, the third party logging proxy server bears the risk of merchants failing to pay. A combination of payment schemes can be used, for example paying one group of copyright holders based on the amount collected whereas another group of copyright holders is paid based on the amount of royalties due notwithstanding the merchant's actual payment. The third party logging proxy server can adjust for the risk by increasing its transaction percentage for those transactions in which it is taking the risk and offering a lower transaction percentage for those transactions where the merchant is assuming the risk. In any event, sales and royalty payment system calculates payment 296 and sends the payment to copyright holder 280, either electronically or using a traditional check (see FIG. 6 for further payment processing details).

Figure 3:
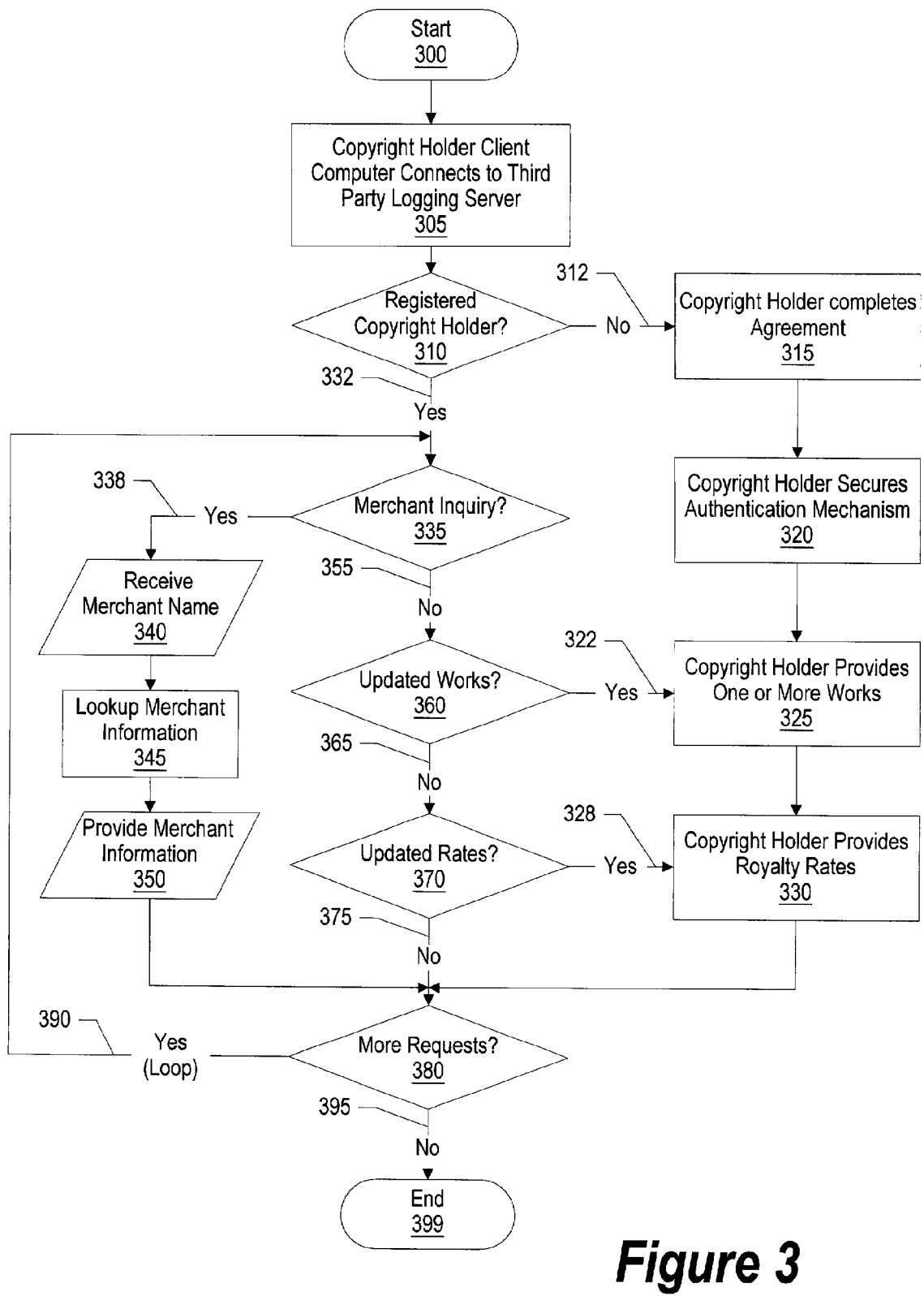
FIG. 3 is a flowchart showing a copyright holder's use of a third party logging proxy server.

FIG. 3 shows a flowchart of a copyright holder's use of a third party logging proxy server. Processing commences at 300 whereupon a copyright holder client computer connects to the third party logging proxy server (step 305). The third party logging proxy server determines whether the copyright holder is a registered user (decision 310). Decision 310 can be accomplished by determining whether the copyright holder has a valid username and password. If the copyright holder is not a registered user, decision 310 branches to "no" branch 312 whereupon the copyright holder completes an online agreement setting out the terms and condition regarding the copyright holder's use of the third party logging proxy server and the fees that the third party logging proxy server will charge the copyright holder for the services (step 315). The copyright holder secures an authentication mechanism (step 320), such as a username and password sent to the copyright holder's email account for subsequent uses by the copyright holder of the third party logging proxy server. Now that the copyright holder is registered, the copyright holder can upload one or more copyrighted works (step 325) to the third party logging proxy server for distribution by merchants. The copyright holder also provides royalty rates (step 330) corresponding with the uploaded copyrighted works.

If the copyright holder is already a registered user of the third party logging proxy server, decision 310 branches to "yes" branch 332. If the copyright holder wants to perform a merchant inquiry, decision 335 branches to "yes" branch 338. The third party logging proxy server receives the names of one or more merchants that the copyright holder would like searched (input 340). The merchants specified by the copyright holder are searched (step 345) to determine (i) whether the merchants are registered users of the third party logging proxy server, and (ii) if the merchant is a registered user, sales data from the merchant corresponding to the copyright holder's works. The merchant information gathered by the third party logging proxy server is then returned to the copyright holder (output 350). On the other hand, if the copyright holder does not wish to perform a merchant inquiry, decision 335 branches to "no" branch 355 and processing continues.

If the registered copyright holder would like to upload new, or updated, copyrighted works to the third party logging proxy server, decision 360 branches to "yes" branch 322 whereupon the copyright holder uploads one or more copyrighted works (step 325) and may also specify royalty rates to apply to the newly uploaded works (or any of the copyright holder's previously uploaded works) (step 330). On the other hand, if the copyright holder does not wish to upload new or updated works, decision 360 branches to "no" branch 365 and processing continues.

If the copyright holder would like to alter the royalty rates that apply to the copyright holder's previously uploaded copyrighted works, decision 370 branches to "yes" branch 328 whereupon the copyright holder provides the updated royalty rates that apply to the works (step 330). On the other hand, if the copyright holder does not wish to alter royalty rates, decision 370 branches to "no" branch 375 and processing continues.

A determination is made whether the copyright holder has any more requests (decision 380). If the copyright holder has more requests, "yes" branch 390 is taken whereupon processing loops back to process the copyright holder's next request. When the copyright holder has no more requests, decision 380 branches to "no" branch 395 and processing ends at 399.

Figure 4:
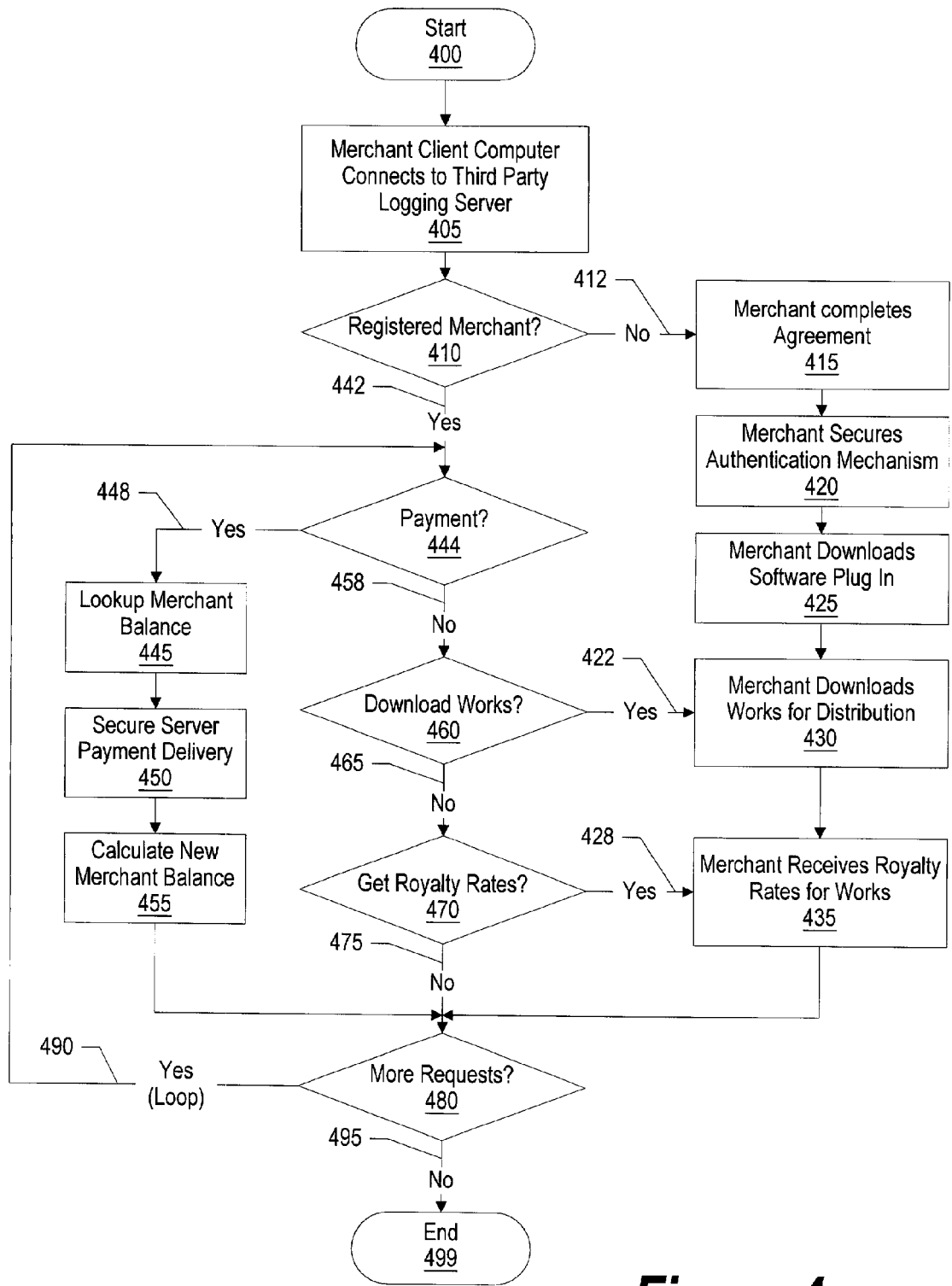
FIG. 4 is a flowchart showing an online merchant's use of a third party logging proxy server.

FIG. 4 shows a flowchart of a merchant's use a third party logging proxy server. Processing commences at 400 whereupon a merchant client computer connects to the third party logging proxy server (step 405). A determination is made as to whether the merchant is already registered with the third party logging proxy server (decision 410). This decision can be made based upon a username and password supplied by the third party logging proxy server to the merchant. If the merchant is not yet registered, decision 410 branches to "no" branch 412 whereupon registration processing takes place. The merchant completes an online agreement (step 415) providing the merchant's name, address, credit information, and other business information. After the third party logging proxy server approves the merchant based on the completed agreement, the third party logging proxy server provides the merchant with an authentication mechanism (step 420), such as a username and password, that the merchant will use to gain subsequent access to the third party logging proxy server. The merchant also downloads a software module (step 425) which is installed on the merchant's computer to automatically inform the third party logging proxy server of sales of copyrightable works made by the merchant. The merchant, by way of the agreement entered in step 415, agrees to use the software plug in and not circumvent or alter its function of recording the merchant's sales. The merchant downloads one or more copyrighted works stored on the third party logging proxy server for sale to the merchant's customers (step 430). The merchant also downloads royalty rates for copyrighted works (step 435). The royalty rates may be used by the merchant to automatically calculate a price for the works by multiplying the royalty rates by a profit margin desired by the merchant. On the other hand, if the merchant is already registered, decision 410 branches to "yes" branch 442 and processing continues.

Decision 444 determines whether the merchant wishes to make a payment on its account maintained by the third party logging proxy server. If the merchant wishes to make a payment, decision 444 branches to "yes" branch 448 whereupon the merchant's balance for sales of copyrighted works maintained by the third party logging proxy server is retrieved (step 445). The merchant makes the appropriate payment (step 450), perhaps using a secured area on the third party logging proxy server's web site using a credit card or otherwise transferring funds. A new balance corresponding to the merchant is calculated (step 455) based upon the payment made by the merchant. As previously described, the third party logging proxy server may be configured to require merchants to prepay an amount that is debited when the merchant makes sales. The amount in the merchants account is then periodically refreshed by the merchant to provide additional money from which royalty payments are made. If the merchant does not wish to make a payment, decision 444 branches to "no" branch 458 and processing continues.

If the merchant would like to download new, or updated, copyrighted works from the third party logging proxy server, decision 460 branches to "yes" branch 422 whereupon the merchant downloads one or more copyrighted works (step 430) and also downloads royalty rates that apply to the downloaded works (step 435). On the other hand, if the merchant does not wish to download new or updated works, decision 460 branches to "no" branch 465 and processing continues.

If the merchant would like download any royalty rates that apply to the copyrighted works, decision 470 branches to "yes" branch 428 whereupon the merchant receives the requested royalty rates (step 435). On the other hand, if the merchant does not wish to receive royalty rates, decision 470 branches to "no" branch 475 and processing continues.

A determination is made whether the merchant has any more requests (decision 480). If the merchant has more requests, "yes" branch 490 is taken whereupon processing loops back to process the merchant's next request. When the merchant has no more requests, decision 480 branches to "no" branch 495 and processing ends at 499.

Figure 5:
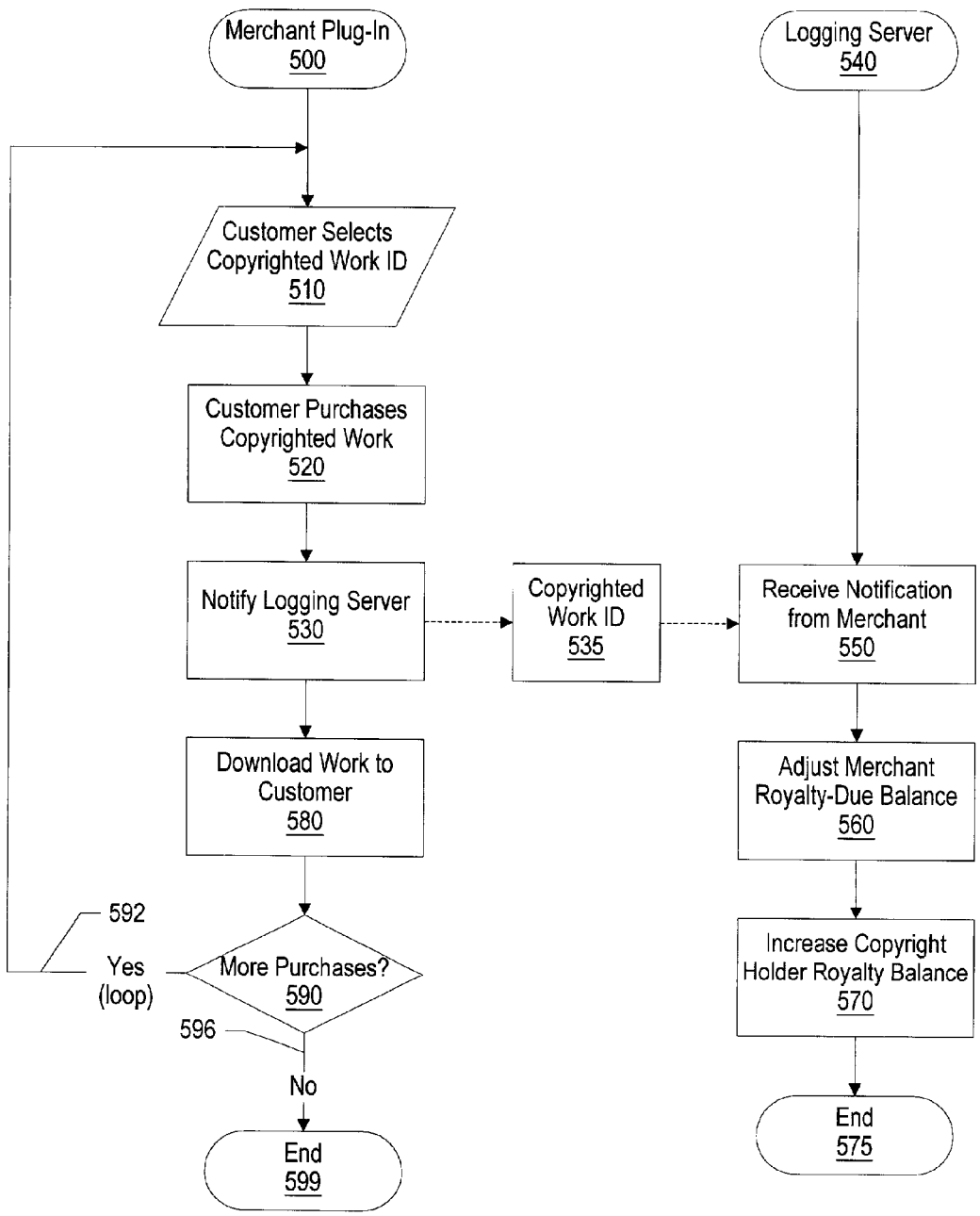
FIG. 5 is a flowchart showing the third party logging proxy server tracking an online merchant's sale of copyrighted works.

FIG. 5 shows a flowchart of an online merchant's use of a third party logging proxy server. During the merchant's registration process, a software module used for logging the merchant's sales was downloaded and installed on the merchant's computer (see FIG. 4, step 425). The merchant plug in software process commences at 500 whereupon one of the merchant's customers selects a copyrighted work he or she wishes to purchase (input 510). The customer purchases the copyrighted work (step 520), using the merchant's payment system, such as a secure location on the merchant's web site. The plug in software installed by the merchant during the registration process notifies the third party logging proxy server that the merchant made a sale (step 530). Identifier 535 corresponding to the copyrighted work is transmitted through the computer network to the third party logging proxy server.

Third party logging proxy server processing commences at 540 whereupon it receives the notification from the merchant (step 550). The third party logging proxy server adjusts the merchant's balance (step 560) by either subtracting the royalty amount from a prepaid balance or adding the royalty amount to an amount due balance. The third party logging proxy server also adds the royalty amount (less any amount charged by the third party logging proxy server as a transaction fee) to the copyright holder's account balance (step 570). The copyright holder is paid at the end of a billing cycle, for example at the end or beginning of each month. Third party logging proxy server processing then ends at 575.

Merchant processing continues with the merchant downloading the copyrightable work to the customer (step 580). A decision is made whether there are more purchases (decision 590). If there are more purchases, decision 590 branches to "yes" branch 592 which loops back to process the next customer purchase. If there are no more purchase, decision 590 branches to "no" branch 596 and merchant plug in software processing ends at 599.

Figure 6:
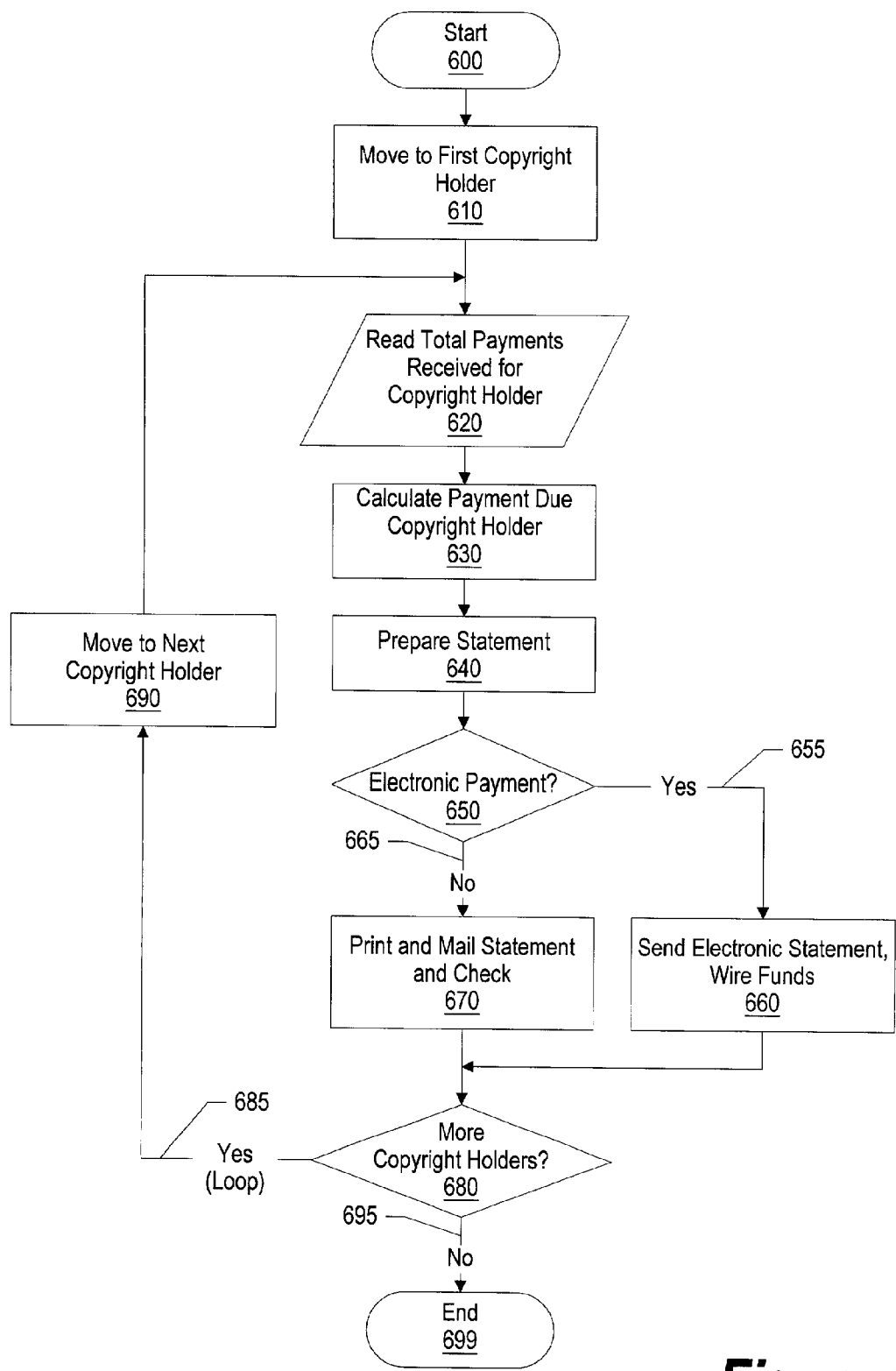
FIG. 6 is a flowchart showing a third party logging proxy server processing royalty checks for its registered copyright holders.

FIG. 6 shows a flowchart of a third party logging proxy server processing royalty checks for its registered copyright holders. At the end of a billing cycle, for example at the end of each month or quarter, the third party logging proxy server processes its registered copyright holders and calculates the royalty amount due to the copyright holder and pays the copyright holder accordingly. Processing commences at 600 whereupon the first copyright holder record is read (input 610). In a database setting, this can be accomplished with a "Move First" command executed with the copyright holder database table. The total number of payments received from merchants for this copyright holder during the billing cycle are read (input 620). A payment amount is calculated (step 630) from this amount by subtracting any transactional fees that may be charged by the third party logging proxy server. A statement is prepared showing the credits and debits to the copyright holder's account (step 640). A determination is made whether the copyright holder receives electronic payment or is sent a check (decision 650). If the copyright holder receives electronic payment, decision 650 branches to "yes" branch 655 whereupon an electronic statement is sent to the copyright holder's email account and the copyright holder's payment is sent via a wire transaction such as an electronic funds transfer (step 660). On the other hand, if the copyright holder does not receive electronic payments, decision 650 branches to "no" branch 665 whereupon the statement and check are printed and mailed to the copyright holder (step 670).

If there are more copyright holders in the third party logging proxy server copyright holder database table, "yes" branch 685 is taken whereupon the database processing moves to the next copyright holder (step 690) before looping back to process the next copyright holder. This processing continues until there are no more copyright holders to process, in which case decision 680 branches to "no" branch 695 and processing terminates at end 699.

Figure 7:
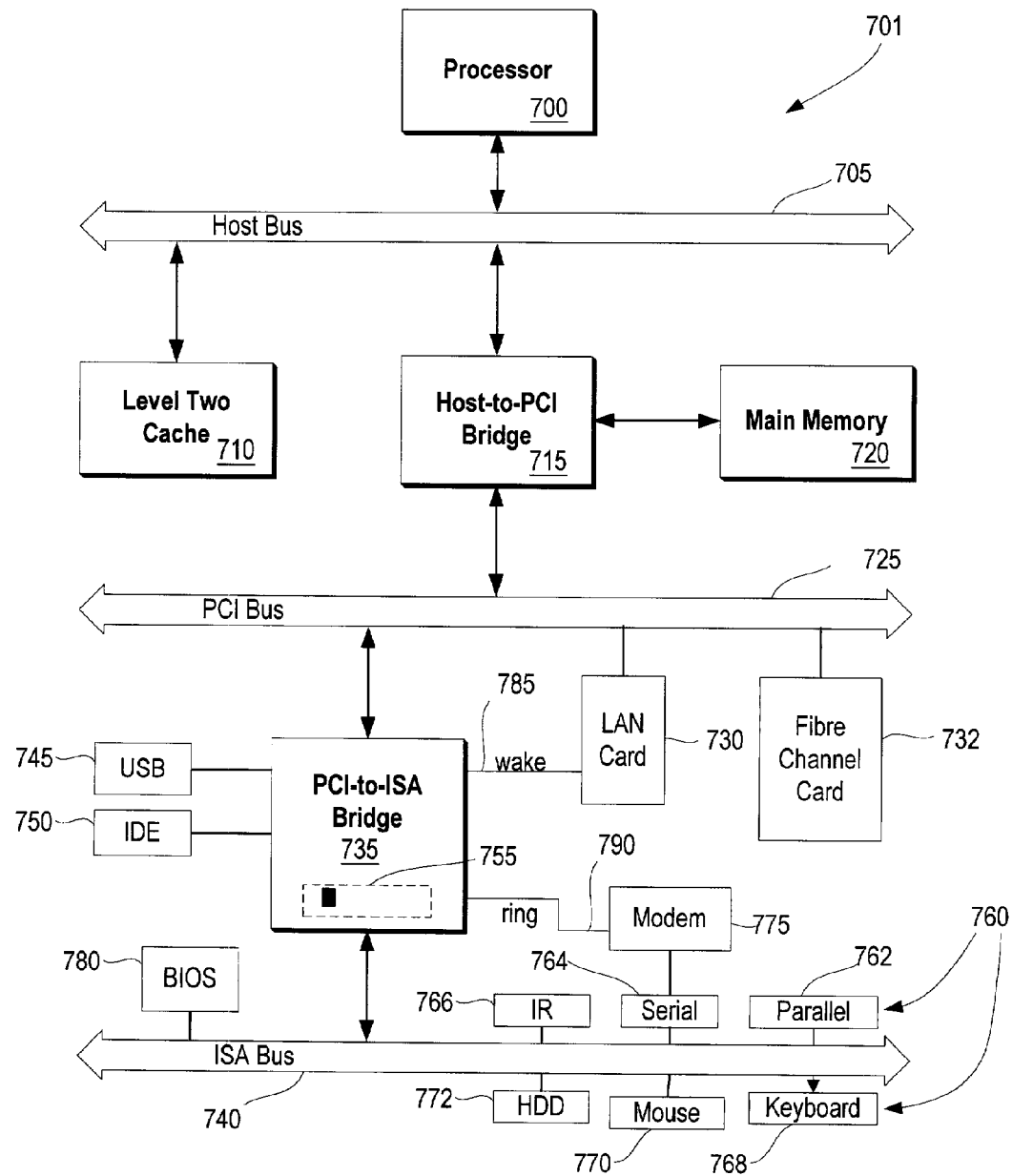
FIG. 7 is a block diagram of an information handling system capable of implementing the present invention.

FIG. 7 illustrates information handling system 701 which is a simplified example of a computer system capable of performing the various server and client operations. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
    obtaining, at a third party logging server, a plurality of digital works from a plurality of provider computer systems;
    storing the received digital works on a nonvolatile storage device accessible from the third party logging server;
    receiving, at the third party logging server, a product sale request from a merchant computer system, wherein the product sale request is received over a computer network;
    transmitting, from the third party logging server through the computer network to the merchant computer system, one or more of the digital works, wherein the merchant computer system is adapted to provide the transmitted digital works to one or more customer computer systems;
    recording, at the third party logging server, a sales record corresponding to the product sale request; and
    registering a merchant corresponding to the merchant computer system with the third party logging server, the registration including an agreement with the merchant regarding use of the digital works and payment for receipt of the digital works, wherein the registration occurs before the receiving, transmitting, and recording.

2. The computer implemented method of claim 1 further comprising:
    providing the merchant computer system with an authentication mechanism in response to the registration of the merchant; and
    authenticating the merchant computer system using the authentication mechanism prior to the transmission of digital works to the merchant computer system from the third party logging server.

3. The computer implemented method of claim 1 further comprising:
    sending a plug-in software module for installation on the merchant computer system, the plug-in software module adapted to notify the third party logging server whenever a customer purchases one of the digital works from the merchant computer system; and
    receiving, from the merchant computer system, a notification that one or more of the digital works has been purchased from the merchant computer system, wherein the recording of the sales record corresponding to the product sale request is performed in response to receiving the notification.

4. The computer implemented method of claim 3 wherein the notification is sent to the third party logging server over the computer network by the plug-in software module installed at the merchant computer system.

5. The computer implemented method of claim 3 wherein the notification includes one or more digital work identifiers that correspond to the digital works that have been purchased from the merchant computer system and a merchant identifier that identifies the merchant.

6. The computer implemented method of claim 5 wherein the recording further comprises:
    identifying a royalty rate corresponding to the digital work identifiers;
    calculating a purchase amount based upon the royalty rate; and
    including the purchase amount in the sales record.

7. The computer implemented method of claim 6 further comprising:
    preparing a billing statement that includes the sales record; and
    providing the billing statement to the merchant.

8. The computer implemented method of claim 7 further comprising:
    for each of the provider computer systems, registering a provider corresponding to the provider computer system with the third party logging server, the registration including an agreement with the provider regarding use of the digital works and payment for use of the digital works by merchants, wherein the registration occurs before the obtaining and the storing.

9. The computer implemented method of claim 8 further comprising:
identifying a set of one or more providers from the plurality of providers from which the digital works sold by the merchant were obtained;
determining a royalty amount for each of the identified providers;
preparing a royalty statement to the identified providers, the royalty statement including the royalty amount; and
electronically sending the royalty statements and funds corresponding to the royalty amounts to the providers.

10. The computer implemented method of claim 1 further comprising:
sending the product sale request from the merchant computer system to the third party logging server in response to a customer requesting to purchase the digital works from the merchant computer system;
receiving, at the merchant computer system, the digital works transmitted from the third party logging server; and
transmitting the received digital works from the merchant computer system to the customer computer system after the merchant computer system has received the digital works.

11. The computer implemented method of claim 1 further comprising:
receiving, from one or more of the providers a royalty rate corresponding to one or more of the digital works;
calculating an amount due from the merchant based upon the royalty rate of the digital works transmitted to the merchant computer system; and
billing the merchant the amount due.

12. An information handling system comprising:
one or more processors;
a memory accessible by the processors;
a network interface connecting the information handling system to a computer network;
a nonvolatile storage device accessible by the processors; and
a logging tool, the logging tool including:
means for obtaining, at the information handling system, a plurality of digital works from a plurality of provider computer systems;
means for storing the received digital works on the nonvolatile storage device;
means for receiving, at the information handling system, a product sale request from a merchant computer system, wherein the product sale request is received over a computer;
means for transmitting, from the information handling system through the computer network to the merchant computer system, one or more of the digital works, wherein the merchant computer system is adapted to provide the transmitted digital works to one or more customer computer systems;
means for recording, on the nonvolatile storage device, a sales record corresponding to the product sale request; and
means for registering a merchant corresponding to the merchant computer system with the information handling system, the registration including an agreement with the merchant regarding use of the digital works and payment for receipt of the digital works, wherein the registration occurs before the performance of the means for receiving, the means for transmitting, and the means for recording.

13. The information handling system of claim 12 further comprising:
means for providing the merchant computer system with an authentication mechanism in response to the registration of the merchant; and
means for authenticating the merchant computer system using the authentication mechanism prior to the transmission of digital works to the merchant computer system from the information handling system.

14. The information handling system of claim 12 further comprising:
means for sending a plug-in software module for installation on the merchant computer system, the plug-in software module adapted to notify the information handling system whenever a customer purchases one of the digital works from the merchant computer system; and
means for receiving, from the merchant computer system, a notification that one or more of the digital works has been purchased from the merchant computer system, wherein the means for recording of the sales record corresponding to the product sale request is performed in response to receiving the notification.

15. The information handling system of claim 14 wherein the notification is sent to the third party logging server over the computer network by the plug-in software module installed at the merchant computer system.

16. The information handling system of claim 14 wherein the notification includes one or more digital work identifiers that correspond to the digital works that have been purchased from the merchant computer system and a merchant identifier that identifies the merchant.

17. The information handling system of claim 16 wherein the means for recording further comprises:
means for identifying a royalty rate corresponding to the digital work identifiers;
means for calculating a purchase amount based upon the royalty rate; and
means for including the purchase amount in the sales record.

18. The information handling system of claim 17 further comprising:
means for preparing a billing statement that includes the sales record; and
means for providing the billing statement to the merchant.

19. The information handling system of claim 18 further comprising:
for each of the provider computer systems, means for registering a provider corresponding to the provider computer system with the information handling system, the registration including an agreement with the provider regarding use of the digital works and payment for use of the digital works by merchants, wherein the registration occurs before the performance of the means for obtaining and the means for storing.

20. The information handling system of claim 19 further comprising:
means for identifying a set of one or more providers from the plurality of providers from which the digital works sold by the merchant were obtained;
means for determining a royalty amount for each of the identified providers;

means for preparing a royalty statement to the identified providers, the royalty statement including the royalty amount; and means for electronically sending the royalty statements and funds corresponding to the royalty amounts to the providers.

21. The information handling system of claim 12 further comprising:

means for sending the product sale request from the merchant computer system to the information handling system in response to a customer requesting to purchase the digital works from the merchant computer system;

means for receiving, at the merchant computer system, the digital works transmitted from the information handling system; and means for transmitting the received digital works from the merchant computer system to the customer computer system after the merchant computer system has received the digital works.

22. The information handling system of claim 12 further comprising:

means for receiving, from one or more of the providers a royalty rate corresponding to one or more of the digital works;

means for calculating an amount due from the merchant based upon the royalty rate of the digital works transmitted to the merchant computer system; and means for billing the merchant the amount due.

23. A computer program product stored on a computer operable medium comprising:

means for obtaining, at a third party logging server, a plurality of digital works from a plurality of provider computer systems;

means for storing the received digital works on a non-volatile storage device accessible from the third party logging server;

means for receiving, at the third party logging server, a product sale request from a merchant computer system, wherein the product sale request is received over a computer network;

means for transmitting, from the third party logging server through the computer network to the merchant computer system, one or more of the digital works, wherein the merchant computer system is adapted to provide the transmitted digital works to one or more customer computer systems;

means for recording, at the third party logging server, a sales record corresponding to the product sale request; and means for means for registering a merchant corresponding to the merchant computer system with the third party logging server, the registration including an agreement with the merchant regarding use of the digital works and payment for receipt of the digital works, wherein the registration occurs before the means for receiving, the means for transmitting, and the means for recording.

24. The computer program product of claim 23 further comprising:

means for providing the merchant computer system with an authentication mechanism in response to the registration of the merchant; and means for authenticating the merchant computer system using the authentication mechanism prior to the transmission of digital works to the merchant computer system from the third party logging server.

25. The computer program product of claim 23 further comprising:

means for sending a plug-in software module for installation on the merchant computer system, the plug-in software module adapted to notify the third party logging server whenever a customer purchases one of the digital works from the merchant computer system; and means for receiving, from the merchant computer system, a notification that one or more of the digital works has been purchased from the merchant computer system, wherein the means for recording of the sales record corresponding to the product sale request is performed in response to receiving the notification.

26. The computer program product of claim 25 wherein the notification is sent to the third party logging server over the computer network by the plug-in software module installed at the merchant computer system.

27. The computer program product of claim 25 wherein the notification includes one or more digital work identifiers that correspond to the digital works that have been purchased from the merchant computer system and a merchant identifier that identifies the merchant.

28. The computer program product of claim 27 wherein the means for recording further comprises:

means for identifying a royalty rate corresponding to the digital work identifiers;

means for calculating a purchase amount based upon the royalty rate; and means for including the purchase amount in the sales record.

29. The computer program product of claim 28 further comprising:

preparing a billing statement that includes the sales record; and providing the billing statement to the merchant.

30. The computer program product of claim 29 further comprising:

for each of the provider computer systems, means for registering a provider corresponding to the provider computer system with the third party logging server, the registration including an agreement with the provider regarding use of the digital works and payment for use of the digital works by merchants, wherein the registration occurs before the performance of the means for obtaining and the means for storing.

31. The computer program product of claim 30 further comprising:

means for identifying a set of one or more providers from the plurality of providers from which the digital works sold by the merchant were obtained;

means for determining a royalty amount for each of the identified providers;

means for preparing a royalty statement to the identified providers, the royalty statement including the royalty amount; and means for electronically sending the royalty statements and funds corresponding to the royalty amounts to the providers.

32. The computer program product of claim 23 further comprising:

means for sending the product sale request from the merchant computer system to the third party logging server in response to a customer requesting to purchase the digital works from the merchant computer system;

means for receiving, at the merchant computer system, the digital works transmitted from the third party logging server; and means for transmitting the received digital works from the merchant computer system to the customer computer system after the merchant computer system has received the digital works.

33. The computer program product of claim 23 further comprising:

means for receiving, from one or more of the providers a royalty rate corresponding to one or more of the digital works;

means for calculating an amount due from the merchant based upon the royalty rate of the digital works transmitted to the merchant computer system; and means for billing the merchant the amount due.

* * * * *